(12) United States Patent
Hirade

(10) Patent No.: US 7,042,862 B1
(45) Date of Patent: May 9, 2006

(54) PATH SEARCHING METHOD AND DEVICE

(75) Inventor: Sei Hirade, Tokyo (JP)

(73) Assignee: NEC Corporation, Tokyo (JP)

( * ) Notice: Subject to any disclaimer, the term of this patent is extended or adjusted under 35 U.S.C. 154(b) by 1011 days.

(21) Appl. No.: 10/031,346

(22) PCT Filed: Jul. 21, 2000

(86) PCT No.: PCT/JP00/04882

§ 371 (c)(1),
(2), (4) Date: Jan. 18, 2002

(87) PCT Pub. No.: WO01/06673

PCT Pub. Date: Jan. 25, 2001

(30) Foreign Application Priority Data

Jul. 21, 1999 (JP) ................................ 11-205471

(51) Int. Cl.
*H04J 13/00* (2006.01)
(52) U.S. Cl. ...................... 370/335; 370/342; 370/441; 370/479; 375/144; 375/148
(58) Field of Classification Search ................ 370/335, 370/342, 441, 479, 491, 500; 375/140, 141, 375/147, 148, 144, 346, 347
See application file for complete search history.

(56) References Cited

U.S. PATENT DOCUMENTS

| 5,822,364 | A | * | 10/1998 | Yamada et al. | ............. | 375/147 |
| 6,272,167 | B1 | * | 8/2001 | Ono | ............................ | 375/144 |
| 6,333,947 | B1 | * | 12/2001 | van Heeswyk et al. | ...... | 375/148 |
| 6,356,542 | B1 | * | 3/2002 | Hayata | ....................... | 370/342 |

FOREIGN PATENT DOCUMENTS

| EP | 0 820 156 A2 | 1/1998 |
| EP | 820156 | 1/1998 |
| EP | 0 895 365 A2 | 2/1999 |
| GB | 2 345 774 A | 7/2000 |
| JP | 11-55215 | 2/1999 |

(Continued)

OTHER PUBLICATIONS

A. Aoyama et al., "Path-search Performance of DS-CDMA System in Laboratory and Field Experiments," IEICE Technical Report, 1997, (XP002946578), pp. 51-58.

(Continued)

*Primary Examiner*—Ricky Q. Ngo
*Assistant Examiner*—Duc Duong
(74) *Attorney, Agent, or Firm*—Foley & Lardner LLP

(57) ABSTRACT

A path searching apparatus which is used in a base station apparatus according to the CDMA (Code Division Multiple Access) systems for increasing the accuracy for path detection depending on the number of communication channels to be processed. The path searching apparatus has a path searcher for generating a delay profile through to a path searching process composed of a plurality of processing units, an interpolation information storage for storing interpolation information indicative of whether an interpolation process for reducing a chip interval is to be performed or not before and after each of the processing units, an interpolation position processing control for enabling the path searcher to perform an interpolation process before and after each of the processing units based on the interpolation information stored in the interpolation information storage according to the number of the communication channels to be processed, and a path detector for detecting a reception path based on the delay profile generated by the path searcher.

17 Claims, 7 Drawing Sheets

FOREIGN PATENT DOCUMENTS

JP  2000-122747  4/2000
JP  2000-244367  9/2000

OTHER PUBLICATIONS

Patent Abstract of Japan, vol. 2000, No. 12, 2001, "Spread Spectrum Receiver", Abstract.

Aoyama, A. et al. "Shitsunai/Okugai Jikken ni yoru DS-CDMA System no Pass Search Tokusei," *Technical Search Report of the Institute of Electronics, Information and Communication Engineers* (1997), vol. 97, No. 399, pp. 51-58.

* cited by examiner

| Interpolation position | Number of channels | | |
| --- | --- | --- | --- |
| | 1 | 2 | 3 |
| Before correlation value calculation | Interpolation Oversampling number "2" | Interpolation Oversampling number "2" | Interpolation Oversampling number "2" |
| Before in-phase addition | Interpolation Oversampling number "2" | No Interpolation | No Interpolation |
| After in-phase addition is finished | No Interpolation | Interpolation Oversampling number "2" | No Interpolation |
| After power addition is finished | No Interpolation | No Interpolation | Interpolation Oversampling number "2" — 58 — 59 |

Fig. 7

PATH SEARCHING METHOD AND DEVICE

TECHNICAL FIELD

The present invention relates to a method of and an apparatus for searching for a certain path from a plurality of paths by interpolating a reception signal in radio communications. More particularly, the present invention relates to a method of and an apparatus for path search to remove the effect of multipath fading by interpolating a reception signal of a code division multiple access (CDMA) system, for example.

BACKGROUND ART

In recent years, mobile communication systems such as portable telephone systems have been in widespread use as multifunctional inexpensive communication systems because of the advanced semiconductor technology and mobile communication technology. Multiplexing schemes that have heretofore been available for mobile communication systems, typically portable telephone systems, include frequency division multiple access (FDMA) and time division multiple access (TDMA) schemes. Recently, there has been put to use a CDMA mobile communication system, which is capable of multiplexing more channels in the same frequency range than the above multiplexing schemes, as a next-generation mobile communication technology.

According to the CDMA mobile communication system, a transmission signal is spread at the transmission side into a wide frequency range using an inherent spreading code that is allotted to the signal, and a reception signal is despread (demodulated) using the same spreading code at the reception side. As a result, it is possible to mix a plurality of channels spread by respective inherent spreading codes from a plurality of users in one frequency band.

In a mobile communication system, a transmission signal from the transmission side is generally subject to multipath fading in its propagation. Specifically, a reception side receives a combination of waves propagating over different paths and received at different time instants, i.e., direct and reflected waves propagating through different paths. The effect of such multipath fading needs to be removed in order to improve the reception quality. A path search device in a base station apparatus of a mobile communication system interpolates a reception signal to increase the accuracy of path detection to detect a received wave over a certain path for thereby efficiently removing the effect of multipath fading.

For example, a path search device in a base station apparatus of a CDMA mobile communication system is constituted as a searcher of the base station apparatus. The searcher interpolates the reception signal to reduce chip intervals of the reception signal to detect a reception time instant at which a signal is to be received. The base station apparatus also has fingers associated with the searchers for extracting certain paths from the reception signal based on the reception time instant detected by the searchers and performing RAKE combining.

FIG. 1 schematically shows an arrangement of a conventional base station apparatus in a CDMA mobile communication system. Here, only the reception function portion of the base station apparatus is illustrated.

Base station apparatus 10 comprises antenna 11 for receiving a transmission signal that has been spread according to CDMA scheme from a mobile terminal on a transmission side, not shown, receiver 12 having an interface function for a signal received by antenna 11 and demodulating the reception signal, parameter manager 13 for allotting spreading codes to respective communication channels (CHs) and managing the spreading codes, N searchers $14_1$ to $14_N$ and N fingers $15_1$ to $15_N$ for being allotted to the respective communication channels by parameter manager 13, and reception processor 16 for performing a predetermined reception process on the reception signal over certain paths extracted by fingers $15_1$ to $15_N$. Searchers $14_1$ to $14_N$ and fingers $15_1$ to 15N are associated with each other in one-to-one correspondence. N searchers $14_1$ to $14_N$ are structurally identical to each other, and N fingers $15_1$ to $15_N$ are also structurally identical to each other. First searcher $14_1$ interpolates reception signal received by receiver 12 to detect a certain reception time instant, and indicates the detected reception time instant to first finger $15_1$ that is associated with first searcher $14_1$. First finger $15_1$ extracts a certain path representing the reception time instant indicated by first searcher $14_1$ from the reception signal received by receiver 12, and despreads the signal propagated over the path. Thereafter, first finger $15_1$ performs RAKE combining on signals of a plurality of paths for which reception time instants are similarly indicated, and outputs the combined signal to reception processor 16. Other searchers $14_2$ to $14_N$ also operate in the same manner as with first searcher $14_1$.

In the mobile communication system including the base station apparatus with the above-described configuration, a non-illustrated mobile terminal on the transmission side sends a framed transmission signal having a plurality of time slots. To each of the time slots, there is added a pilot signal at its leading position which represents a fixed pattern known to both transmission and reception sides. The pilot signal is subjected to quadrature modulation together with the transmission data. After the quadrature modulation, the pilot signal and the transmission data are spectrum-spread using an inherent spread code for the communication channel. The transmission signal thus spread using respective inherent spreading codes in the CDMA system are received by antenna 11 of the base station apparatus. Receiver 12 performs signal interface conversion such as amplification and quadrature demodulation, e.g., multiplies a reception signal received by antenna 11 by a reference frequency which is generated by a reference frequency generator, not shown, with a multiplier, not shown, thereby converting the reception signal into a baseband signal.

Parameter manager 13 is arranged to allot a finger and a searcher to each of communication channels included in the reception signal. For example, parameter manager 13 allots unused fingers and searchers, successively from first finger $15_1$ and first searcher $14_1$ to respective communication channels. Then, parameter manager 13 indicates code generating information for generating corresponding spreading codes to the allotted fingers and searchers, which generate spreading codes that are associated with the code generating information indicated thereto.

Demodulated signal that is demodulated in receiver 12 is supplied to the searchers and fingers that have been allotted by parameter manager 13.

Each searcher interpolates sampling points in order to reduce chip intervals of the reception signal, and generates a delay profile based on the pilot signals added to the leading positions of the time slots of the interpolated signal. In the delay profile, the power values of reception signal components which are orthogonal to each other that are demodulated by receiver 12 are calculated for respective delay times in order to indicate a temporal change of reception time instants of the demodulated signal due to multipath fading.

Usually, the power values calculated for the respective delay times on the delay profile represent peaks on a plurality of different propagating paths due to the effect of the multipath fading. Each searcher then detects peaks in excess of a predetermined threshold, and indicates delay times corresponding to the detected peaks to the finger associated therewith. The finger thus notified then extracts path of the received wave corresponding to the indicated delay time from the demodulated signal produced by receiver 12. The extracted paths are then RAKE-combined and then processed by reception processor 16.

Since the accuracy with which to detect paths depends upon the searchers, the searchers determine the reception quality of the base station apparatus. The arrangement of searchers will be described below. Because searchers $14_1$ to $14_N$ are structurally identical to each other, the arrangement of first searcher $14_1$ will be described. FIG. 2 shows the arrangement of first searcher $14_1$.

First searcher $14_1$ comprises first interpolating filter 20 for interpolating sampling points of the demodulated signal from receiver 12 to reduce chip intervals thereof, correlation value calculator 21 for calculating a correlation value of data interpolated by first interpolating filter 20, in-phase adder 22 and power adder 23 for generating a delay profile based on the calculated correlation value, second interpolating filter 24 for further reducing chip intervals of the generated delay profile, path controller 25 for indicating paths to be extracted to a corresponding finger, and code generator 26 for generating a spreading code for the calculation of the correlation value.

The interpolating filters will be described below. FIG. 3 shows a structure of first interpolating filter 20. It is assumed that the oversampling number is "2" and the tap length is "4". First interpolating filter 20 has first to seventh delay elements $27_1$ to $27_7$, first to eighth multipliers $28_1$ to $28_8$, and adder 29. First to seventh delay elements $27_1$ to $27_7$ are connected in series with each other. Input signals applied to first to seventh delay elements $27_1$ to $27_7$ and an output signal from seventh delay element $27_7$ are supplied respectively to first to eighth multipliers $28_1$ to $28_8$. To first to eighth multipliers $28_1$ to $28_8$, there are applied respective predetermined filter coefficients $C_{-4}$, $C_{-3}$, $C_{-2}$, $C_{-1}$, $C_1$, $C_2$, $C_3$, $C_4$, which are multiplied by the input signals applied to respective delay elements and the output signal from seventh delay element $27_7$. Assuming i=1 to 4, the filter coefficients $C_{-i}$ and $C_i$ are equal to each other. Products produced by respective multipliers $28_1$–$28_8$ are added to each other by adder 29, which is then supplied as output signal 31 of interpolating filter 20 to the outside.

First interpolating filter 20 thus constructed can determine an interpolation point using values of the input signal at four points before and after input signal 30. As input signal 30 are more delayed, the input signal is shifted and interpolating points are successively determined. The interpolated serial interpolating data are supplied as output signal 31 to correlation value calculator 21 (FIG. 2).

Referring back to FIG. 2, based on the code generating information corresponding to the communication channel allotted from the parameter manager to first searcher $14_1$, code generator 26 generates a spreading code corresponding to the communication channel. Correlation value calculator 21 detects the pilot signals added to the leading positions of respective time slots from the interpolation data interpolated by first interpolating filter 20 shown in FIG. 3, and generates ideal reception signals by spreading pre-recognized pilot signals with the spreading code generated by code generator 26. Correlation value calculator 21 then multiplies the detected pilot signals and the generated ideal reception signals to calculate correlation values thereby performing quadrature demodulation on the pilot signals. As a result of the quadrature demodulation, the pilot signals are outputted as I (In-Phase) signals and Q (Quadrature-Phase) signals which are orthogonal to each other. In-phase adder 22 performs a certain number of in-phase additions "I+I", and "Q+Q" on the I signal component and the Q signal component from correlation value calculator 21.

Power adder 23 performs a certain number of power additions "$I^2+Q^2$" on the output from in-phase adder 22. Second interpolating filter 24, which is of the same structure as first interpolating filter 20, interpolates added power data in order to further reduce chip intervals. Path controller 25 refers to a delay profile in which reception signals interpolated and expressed as power values by second interpolating filter 24 are arranged with respect to respective delay times, detects peaks in excess of a predetermined threshold value, and indicates delay times corresponding to the detected peaks to first finger $15_1$.

First searcher $14_1$ thus arranged has a central processing unit (CPU), not shown, which can execute various control processes based on a control program stored in a given storage device such as a read-only memory (ROM) or the like.

FIG. 4 shows the content of the processing of the control program which is stored in such a given storage device. In first searcher $14_1$, modulated signals from receiver 12 are interpolated at "½" chip intervals, for example, in first interpolating filter 20 as step S33. To do so, the oversampling number in the interpolating filter of the constitution shown in FIG. 3 may be set to "2". Then, in step S44, respective correlation values are calculated in correlation value calculator 21 for pilot signals which are of predetermined fixed patterns added to the leading positions of time slots, of the I and Q signals that have been interpolated at the "½" chip intervals. Because the pilot signals are of predetermined fixed patterns, it is possible to accurately determine ideal waveforms at the reception side. In correlation value calculator 21 calculates, correlation values with respect to ideal reception signals produced by spreading pre-recognized pilot signals with spreading codes generated by code generator 26 are calculated in the respective time slots of a received frame. A higher correlation value represents that the waveform of the pilot signal at the leading position of each time slot is closer to an ideal waveform, indicating a better reception sensitivity.

The calculated correlation values are added a given number of times N for I and Q signal components by in-phase adder 22, thus removing noise components contained in the I and Q signals, in step S35. The greater the number of in-phase additions, the smaller the noise components of the I and Q signal components.

The result of the in-phase additions is then added for power a given number of times M by the power adder 23 in step S36. The power values are thus averaged with respect to time, preventing paths from being detected with wrong power values due to instantaneous noise.

The values of in-phase additions are further interpolated at "¼" chip intervals, for example, by second interpolating filter 24 in step S37. As described above, second interpolating filter 24 is of a structure similar to first interpolating filter 20.

The calculated power values represent a delay profile on a temporal axis which indicates reception signals that are converted into power values for respective delay times. Path controller 25 detects peaks in excess of a predetermined threshold, of the power values for respective delay times. Path controller 25 then indicates the delay times corresponding to the peaks in excess of the threshold to first finger $15_1$ in step S38.

As described above, each of the searchers including first finger $15_1$ performs an interpolation process to increase the number of sampling points for increasing the accuracy of a subsequent process in order to achieve a higher accuracy for path detection.

In the conventional path searching apparatus described above, the accuracy for path detection is increased by the interpolation by first and second interpolating filters 20, 24 in steps S33, S37. The number of interpolating operations is greater if they are performed before correlation values are calculated and in-phase additions are made than if they are performed before correlation values are calculated and after power additions are performed in searchers $14_1$ to $14_N$ as in steps S33, S37, resulting in an increased accuracy for path detection. Presently, however, because of a limitation posed on the calculation amount allowed by the searchers, interpolating operations are performed before correlation values are calculated and after power additions are made as in steps S33, S37. The number of interpolating operations increases and the amount of subsequent processing increases due to the interpolating operations also increases. As a result, there is a trade-off between the accuracy for path detection and the amount of processing.

The calculation processing in searchers $14_1$ to $14_N$ varies with time depending on the number of communication channels to be processed. Heretofore, however, interpolating operations have fixedly been performed before correlation values are calculated and after power additions are performed, irrespective of the number of communication channels to be processed. Specifically, if the number of communication channels to be processed by the searchers is small, there is a situation where an extra amount of calculation is available for performing interpolating operations before correlation values are calculated and in-phase additions are made. Heretofore, since interpolating operations are performed in a fixed sequence, the number of interpolating operations is small, making it impossible to increase the accuracy for path detection.

Japanese laid-open patent publication No. Hei 10-190522 (JP, A, 10190522) discloses a technique with respect to a path searching apparatus for using a matched filter to select signals, greater than a predetermined threshold, of all multipath signals in a multipath search range and perform a RAKE combining on the selected signals for thereby combining all multipaths, and excluding the RAKE combining in chip phases where the signal level is low according to a threshold judgment using an average delay profile. According to the disclosed technique, it is also necessary to carry out processing operations in the range of all searched paths at all times regardless of the number of communication channels to be processed. The disclosed path searching apparatus is usually optimized to maintain a certain level of accuracy in a maximum allowable range. However, it is desirable for the path searching apparatus to have as good an accuracy for path detection as possible if the number of communication channels is small and an extra amount of calculation is available.

DISCLOSURE OF THE INVENTION

It is a first object of the present invention to provide a path searching method of increasing the accuracy for path detection depending on the number of communication channels to be processed.

It is a second object of the present invention to provide a path searching apparatus for increasing the accuracy for path detection depending on the number of communication channels to be processed.

The first object can be achieved by a method of searching for a path, comprising:
 a first interpolating step of interpolating a demodulated signal to generate a first interpolated signal;
 a first selecting step of generating a first selected signal by alternatively selecting the first interpolated signal or the demodulated signal based on interpolation information, said interpolation information indicating whether an interpolation process for reducing a chip interval is to be performed or not between processes for generating a delay profile which indicates a temporal change of reception time instants of the demodulated signal due to multipath fading;
 a correlation value calculating step of calculating a correlation value between a pilot pattern which is included in the first selected signal and has a predetermined fixed pattern and a predetermined expected value;
 a second interpolating step of interpolating the correlation value calculated in the correlation value calculating step to generate a second interpolated signal;
 a second selecting step of generating a second selected signal by alternatively selecting the second interpolated signal and the correlation value based on the interpolation information;
 an in-phase adding step of adding in-phase components of the second selected signal for a predetermined number of times;
 a third interpolating step of interpolating an in-phase addition sum calculated in the in-phase adding step to generate a third interpolated signal;
 a third selecting step of generating a third selected signal by alternatively selecting the third interpolated signal or the in-phase addition sum based on the interpolation information;
 a power adding step of adding power values calculated from signal components of the third selected signal for a predetermined number of times;
 a fourth interpolating step of interpolating a power addition sum calculated in the power adding step to generate a fourth interpolated signal;
 a fourth selecting step of generating a fourth selected signal by alternatively selecting the fourth interpolated signal or the power addition sum based on the interpolation information; and
 a path detecting step of detecting a path in excess of a predetermined threshold based on the fourth selected signal.

The second object can be achieved by an apparatus for searching for a path, comprising:
 path searching means for generating a delay profile based on a pilot signal which is included in each time slot and has a fixed pattern, according to a path searching process composed of a plurality of processing units, the delay profile indicating a temporal change of reception time instants due to multipath fading of a demodulated signal;

interpolation information storage means for storing interpolation information indicative of whether an interpolation process for reducing a chip interval is to be performed or not before and after each of the processing units;

interpolation position processing control means for enabling the path searching means to perform an interpolation process before and after each of the processing units based on the interpolation information; and path detecting means for detecting a reception path based on the delay profile generated by the path searching means.

The second object can also be accomplished by an apparatus for searching for a path, comprising:

interpolation information storage means for storing interpolation information indicative of whether an interpolation process for reducing a chip interval between processes for generating a delay profile is to be performed or not, the delay profile indicating a temporal change of reception time instants of a demodulated signal due to multipath fading;

first interpolating means for interpolating the demodulated signal to generate a first interpolated signal;

first selecting means for generating a first selected signal by alternatively selecting the first interpolated signal or the demodulated signal based on the interpolation information;

correlation value calculating means for calculating a correlation value between a pilot pattern which is included in the first selected signal and has a predetermined fixed pattern and a predetermined expected value;

second interpolating means for interpolating the corrected value calculated by the correlation value calculating means to generate a second interpolated signal;

second selecting means for generating a second selected signal by alternatively selecting the second interpolated signal and the correlation value based on the interpolation information;

in-phase adding means for adding in-phase components of the second selected signal for a predetermined number of times;

third interpolating means for interpolating an in-phase addition sum calculated by the in-phase adding means to generate a third interpolated signal;

third selecting means for generating a third selected signal by alternatively selecting the third interpolated signal or the in-phase addition sum based on the interpolation information;

power adding means for adding power values calculated from signal components of the third selected signal for a predetermined number of times;

fourth interpolating means for interpolating a power addition sum calculated in the power adding means to generate a fourth interpolated signal;

fourth selecting means for generating a fourth selected signal by alternatively selecting the fourth interpolated signal or the power addition sum based on the interpolation information; and path detecting means for detecting a path in excess of a predetermined threshold based on the fourth selected signal.

In the present invention, the demodulated signal is typically a signal produced by converting a reception signal of a CDMA (Code Division Multiple Access) system into a baseband signal and processing the baseband signal by way of quadrature demodulation. The interpolation information may preferably comprise information indicative of whether an interpolation process is to be performed or not depending on the number of communication channels to be processed, or information indicative of whether an interpolation process is to be performed or not depending on the reception quality measured in each communication channel of the demodulated signal.

BRIEF DESCRIPTION OF THE DRAWINGS

FIG. 7 is a diagram showing an example of interpolation information stored in an interpolation information memory;

BEST MODE FOR CARRYING OUT THE INVENTION

Preferred embodiments of the present invention will be described in detail below.

FIRST EMBODIMENT

Figure 1:
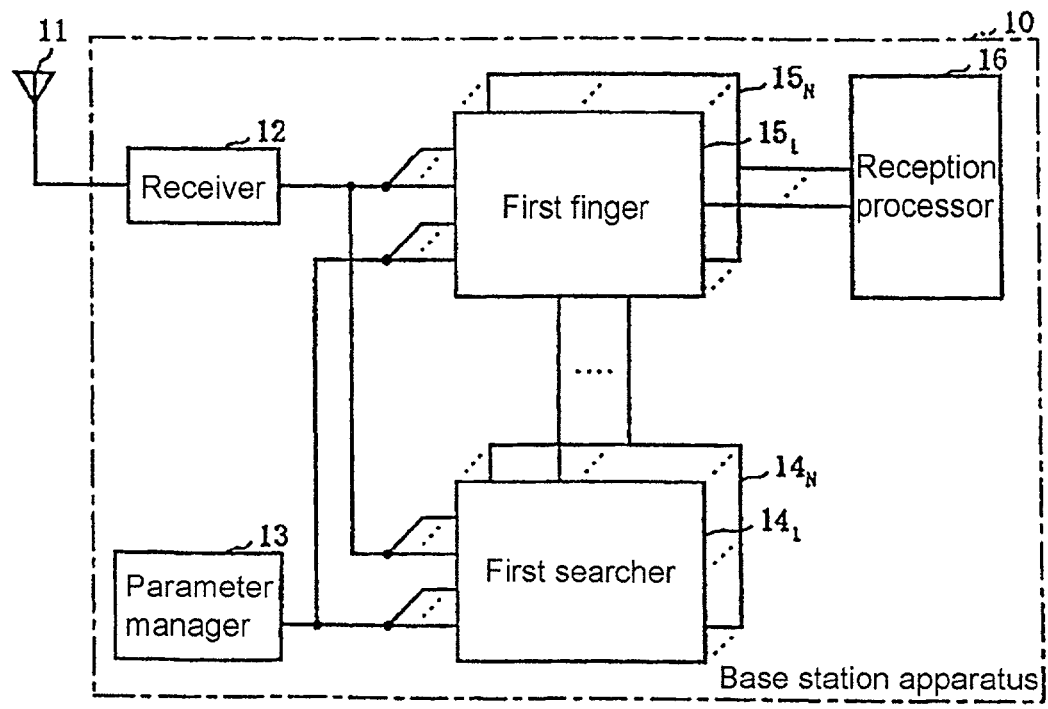
FIG. 1 is a block diagram showing an arrangement of a conventional base station apparatus in a mobile communication system of CDMA scheme.
Figure 4:
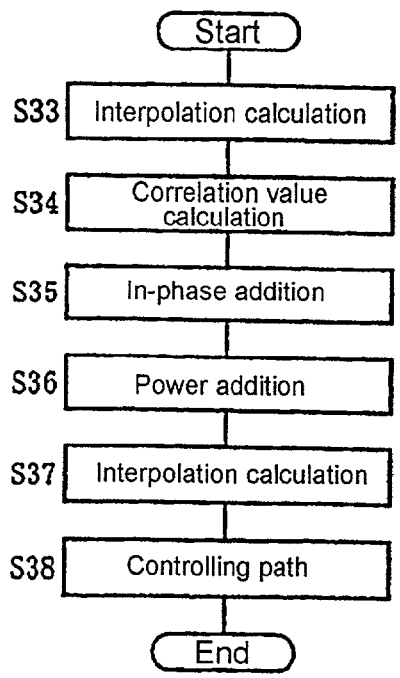
FIG. 4 is a flowchart schematically showing a processing sequence carried out by the searcher shown in FIG. 2.
Figure 2:
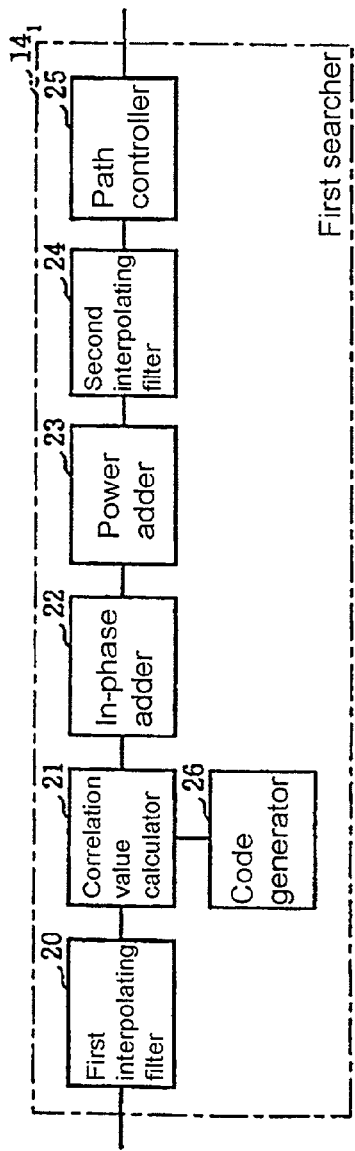
FIG. 2 is a block diagram showing an arrangement of an essential portion of a searcher in the base station apparatus shown in FIG. 1.
Figure 5:
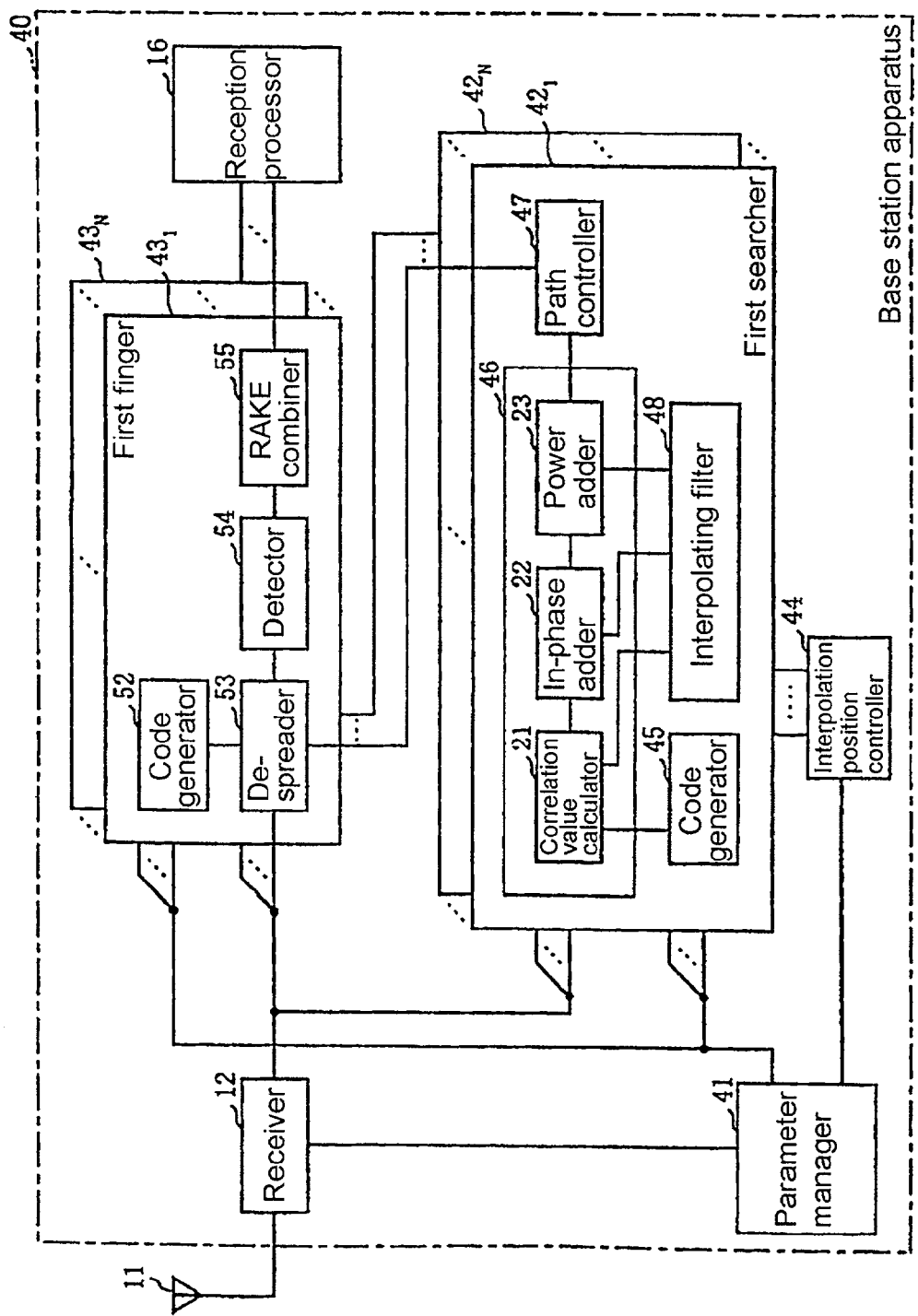
FIG. 5 is a block diagram schematically showing an arrangement of a base station apparatus in a mobile communication system of CDMA scheme which incorporates a path searching apparatus according to a first embodiment of the present invention.

An arrangement of a base station apparatus in a mobile communication system of CDMA scheme to which a path searching apparatus according to a first embodiment of the present invention is applied is schematically shown in FIG. 5. Here, only a receiving function section of the base station apparatus is illustrated. Those components shown in FIG. 5 which are identical to those shown in FIG. 1 are denoted by identical reference characters.

Base station apparatus 40 comprises antenna 11 for receiving a transmission signal that has been spread according to the CDMA scheme from a mobile terminal on a transmission side, not shown, and receiver 12 having an interface function for a signal received by antenna 11 and demodulating the reception signal. Base station apparatus 40 also comprises parameter manager 41 for allotting inherent spreading codes to respective communication channels (CH) and managing the spreading codes, N searchers $42_1$ to $42_N$ and N fingers $43_1$ to $43_N$ for being allotted to the respective communication channels by parameter manager 41, reception processor 16 for performing a predetermined reception process on the reception signal over certain paths extracted by fingers $43_1$ to $43_N$, and interpolation position controller 44 for changing interpolation positions of interpolating processes upon path searching in the searchers.

N searchers $42_1$ to $42_N$ are structurally identical to each other. Here, an arrangement of first searcher $42_1$ will be described below.

As shown in FIG. 5, first searcher $42_1$ comprises code generator 45, path search processor 46, path controller 47, and interpolating filter 48. Code generator 45 generates a spreading code for the communication channel allotted by parameter manager 41. Path search processor 46 has correlation value calculator 21, in-phase adder 22, and power adder 23.

N finger $43_1$ to $43_N$ are structurally identical to each other. Here, an arrangement of first finger $43_1$ will be described below.

First finger $43_1$ comprises code generator 52 for generating a spreading code for the communication channel allotted by parameter manager 41, a despreader 53 for extracting a particular path corresponding to a delay time indicated by first searcher $42_1$ from a demodulated signal from receiver 12 and despreading the signal from the extracted path with the spreading code generated by code generator 52, a detector 54 for performing channel estimation and removing the effect of fading, and a RAKE combiner 55 for combining detected signals.

Details of searchers $42_1$ to $42_N$ and fingers $43_1$ to $43_N$, as exemplified by first searcher $42_1$ and first finger $43_1$ will be described below.

Figure 3:
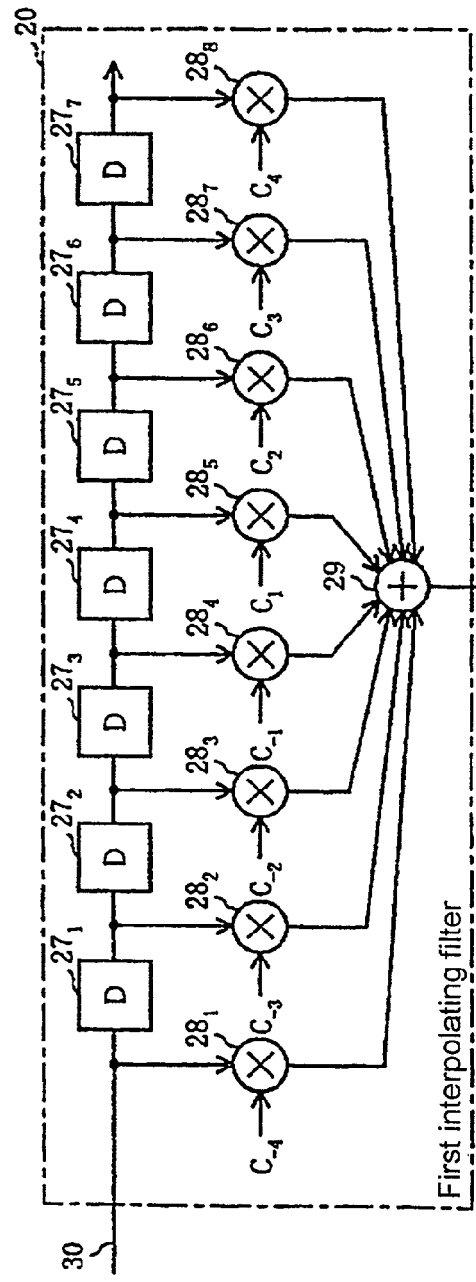
FIG. 3 is a block diagram showing an arrangement of an essential portion of an interpolating filter.

First searcher $42_1$ is supplied with an interpolation position control signal from interpolation position controller 44. According to the interpolation position control signal, first searcher $42_1$ allows interpolating filter 48 to perform an interpolating operation between various processing operations in path search processor 46. Interpolating filter 48 has been provided with interpolating filters corresponding to a plurality of oversampling numbers. Interpolating filter 48 is capable of performing interpolation operation at a plurality of chip intervals when the oversampling number is changed by the interpolation position control signal. Alternatively, interpolating filter 48 may employ the structure shown in FIG. 3 where the oversampling number is "2" and the tap length is "4", and may be looped twice to perform an interpolation process where the oversampling number is "4", for example, with an easy and simple arrangement.

Path controller 47 detects a peak in excess of a predetermined threshold from a delay profile that has been generated as a result of a path searching process in path search processor 46 where an interpolation process is inserted depending on an interpolation position control signal, and indicates a delay time corresponding to the detected peak to first finger $43_1$.

In the present embodiment, a non-illustrated mobile terminal on a transmission side sends a framed transmission signal having a plurality of time slots. The transmission signal is received by base station apparatus 40. To each of the time slots, there is added a pilot signal at its leading position which represents a fixed pattern known to both transmission and reception sides. The pilot signal is quadrature-modulated together with the transmission data and thereafter spread over a spectrum using a spreading code inherent in each communication channel. Transmission signals that have been spread using respective inherent spreading codes according to the CDMA scheme are received at antenna 11. Receiver 12 performs signal interface conversion such as amplification and quadrature demodulation. Here, the signal interface conversion is conversion such as multiplication of a reception signal by a reference frequency which is generated by a reference frequency generator, not shown, with a multiplier to convert the reception signal into a baseband signal.

Parameter manager 41 is capable of allotting the reception signal to fingers $43_1$ to $43_N$ and searchers $42_1$ to $42_N$ for respective communication channels included in the reception signal. For example, parameter manager 41 allots unused fingers and searchers, successively from first finger $43_1$ and first searcher $42_1$, to the reception signal. Then, parameter manager 41 indicates code generating information for generating corresponding spreading codes to the allotted fingers and searchers. The fingers and searchers are constructed such that they generate spreading codes that are associated with the code generating information indicated thereto.

Demodulated signals demodulated by receiver 12 are supplied to those of N searchers $42_1$ to $42_N$ which have been allotted by parameter manager 41 and those of N fingers $43_1$ to $43_N$ which have been allotted by parameter manager 41.

Interpolation position controller 44 refers to code generating information indicated by parameter manager 41 to recognize the number of communication channels. Interpolation information which represents whether an interpolation process is to be inserted or not and the oversampling number at the time when an interpolation process is to be inserted has been stored in interpolation position controller 44 has registered corresponding to the recognized number of communication channels. Interpolation position controller 44 outputs the interpolation information corresponding to the recognized number of communication channels as interpolation position indicating information to each communication channel portion.

First searcher $42_1$ interpolates sampling points in order to reduce chip intervals of the reception signal, and generates a delay profile based on a pilot signal added to the leading position of each time slot of the interpolated signal. In the delay profile, the power values of reception signal components which are orthogonal to each other that are demodulated by receiver 12 are calculated for respective delay times. Usually, the power values calculated for the respective delay times on the delay profile represent peaks on a plurality of different propagating paths due to multipath fading. First searcher $42_1$ then detects peaks in excess of a predetermined threshold, and indicates delay times corresponding to the respective detected peaks to first finger $43_1$ associated with first searcher $42_1$. First finger $43_1$ then extracts paths of received waves corresponding to the indicated delay times from the demodulated signals demodulated by receiver 12. These extracted paths are then estimated for channels by detector 54 for removal of the effect of fading to a certain extent, and are RAKE-combined and then subjected to a predetermined reception processing in reception processor 16.

Figure 6:
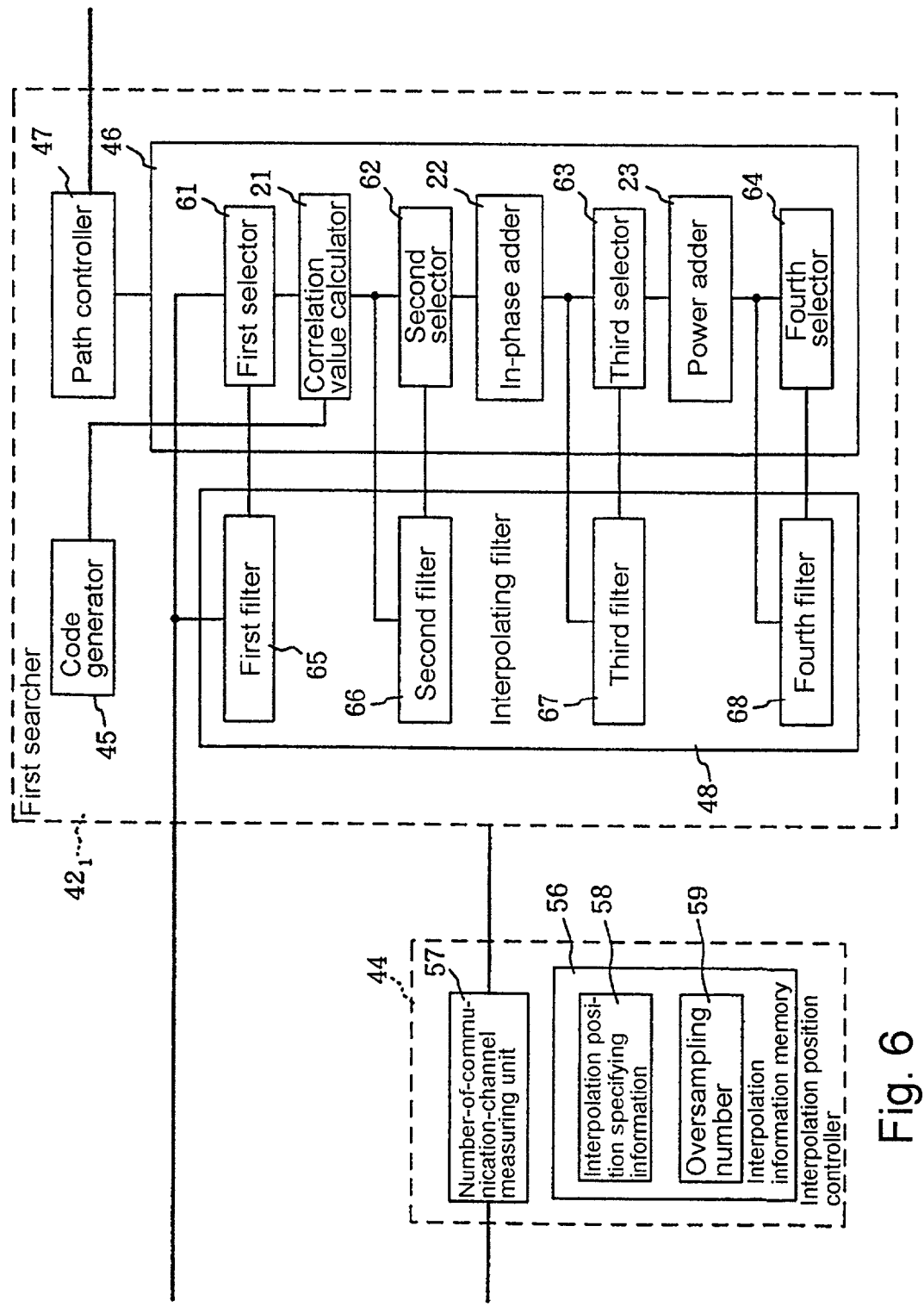
FIG. 6 is a block diagram showing an arrangement of an essential portion of the path searching apparatus according to the first embodiment of the present invention.

FIG. 6 schematically shows an arrangement of an essential portion of first searcher $42_1$ and interpolation position controller 44 which correspond to the path searching apparatus according to the first embodiment of the present invention. Path search processor 46 of first searcher $42_1$ comprises code generator 45 for generating a spreading code for a communication channel allotted to first searcher $42_1$, correlation value calculator 21, in-phase adder 22, and power adder 23. The searcher according to the present embodiment resides in that it can select whether an interpolation process performed by interpolating filter 48 is to be inserted between various processors of path search processor 46 or not, based on interpolation position indicating information indicated from interpolation position controller 44. To perform the above function, each searcher has four selectors 61 to 64. Interpolating filter 48 comprises four filters 65 to 68 depending on the details of its interpolation process.

While interpolating filter 48 inserted in a path searching process comprises four filters 65 to 68 that are selectively used depending on the details of its interpolation process in the illustrated embodiment, one filter may be used as interpolating filter 48 in each process. At any rate, any filter may desirably be arranged within interpolating filter 48 insofar as it can perform an interpolation process between various processes depending on the interpolation position indicating information.

First selector 61 is supplied with a demodulated signal demodulated by receiver 12 and an output signal from first filter 65 which has been interpolated to reduce the chip interval of the demodulated signal, and alternatively selects one of the supplied signals based on the interpolation position indicating information, as a first selected output signal that is supplied to correlation value calculator 21.

Second selector 62 is supplied with a correlation value calculated by correlation value calculator 21 and an output signal from second filter 66 which has been interpolated to reduce the chip interval of the correlation value calculated by correlation value calculator 21, and alternatively selects one of the supplied signals based on the interpolation position indicating information, as a second selected output signal that is supplied to in-phase adder 22.

Third selector 63 is supplied with an in-phase addition result calculated by in-phase adder 22 and an output signal from third filter 67 which has been interpolated to reduce the chip interval of the in-phase addition result calculated by in-phase adder 22, and alternatively selects one of the supplied signals based on the interpolation position indicating information, as a third selected output signal that is supplied to power adder 23.

Fourth selector 64 is supplied with a power addition result calculated by power adder 23 and an output signal from fourth filter 68 which has been interpolated to reduce the chip interval of the power addition result calculated by power adder 23, and alternatively selects one of the supplied signals based on the interpolation position indicating information, as a fourth selected output signal that is supplied to path controller 47.

Correlation value calculator 21 detects pilot signals added to the leading positions of respective time slots of the input signal, and calculates a correlation value between the detected pilot signal and an ideal reception signal which are produced by multiplying and spreading a spreading code generated by code generator 45 and a predetermined pilot signal. In-phase adder 22 performs a certain number of in-phase additions "I+I", "Q+Q" on an I signal and a Q signal, which are signal components orthogonal to each other, of the quadrature-demodulated pilot signal. Power adder 23 performs a certain number of power additions "$I^2+Q^2$" on the signal components that have been added in phase.

Interpolation position controller 44 for outputting interpolation position indicating information comprises interpolation information memory 56 for storing the above interpolation information and number-of-communication-channel measuring unit 57 for measuring the number of communication channels to be processed based on the code generating information indicated by parameter manager 41. Here, number-of-communication-channel measuring unit 57 recognizes the number of communication channels to be processed from the code generating information indicated by parameter manager 41. However, number-of-communication-channel measuring unit 57 may recognize the number of communication channels from a despread signal which is produced by despreading a reception signal. In this case, when despreading is performed by using a spreading code other than the corresponding communication channel, the reception signal becomes almost "0" due to its orthogonal nature. Therefore, when a despread signal whose level is higher than a predetermined level is obtained for a communication channel, the communication channel can be recognized as a communication channel to be processed and it is possible to recognized the number of channels to be processed at respective time points. Interpolation information memory 56 stores interpolation information which comprises interpolation position specifying information 58 indicating whether an interpolation process is to be inserted or not and an oversampling number 59 at the time an interpolation process is to be inserted, the interpolation information corresponding to the number of channels measured by number-of-communication-channel measuring unit 57.

FIG. 7 shows an example of interpolation information stored in interpolation information memory 56. In the interpolation information, interpolation position specifying information 58 indicating whether an interpolation process is to be inserted or not and an oversampling number 59 at the time an interpolation process is to be inserted is registered, corresponding to the number of the communication channels (CH), for each of before and after the process of calculating a correlation value, the process of performing an in-phase addition, and the process of performing a power addition, which are carried out by path search processor 46.

For example, when the number of channels to be processed which is measured by number-of-communication-channel measuring unit 57 is "1", before a correlation value is calculated and before an in-phase addition is performed with the corresponding interpolation position specifying information of "interpolation", interpolation information for performing an interpolation process with the oversampling number "2" is searched for. Similarly, when the number of channels to be processed which is measured by number-of-communication-channel measuring unit 57 is "2", before a correlation value is calculated and after an in-phase addition is performed with the corresponding interpolation position specifying information of "interpolation", interpolation information for performing an interpolation process with the oversampling number "2" is searched for. When the number of channels to be processed which is measured by number-of-communication-channel measuring unit 57 is "3", before a correlation value is calculated and after a power addition is performed with the corresponding interpolation position specifying information of "interpolation", interpolation information for performing an interpolation process with the oversampling number "2" is searched for. As the number of communication channels to be processed is smaller, an interpolation process is thus performed as a pre-process to increase the number of interpolation processes for thereby increasing the accuracy for path detection when an extra amount of calculation is available.

The interpolation information searched for based on the number of channels to be processed which has been measured by number-of-communication-channel measuring unit 57 is indicated, as the interpolation position specifying information which is represented by a control signal having a certain format, to searchers $42_1$ to $42_N$. Though the interpolation position specifying information is illustrated as being indicated to only first searcher $42_1$ in the described which follows, it is actually indicated to a plurality of searchers depending on the reception signal.

Figure 8:
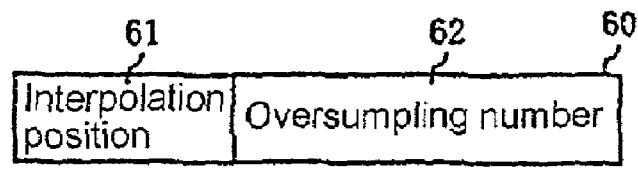
FIG. 8 is a diagram showing an example of a format structure of interpolation position indicating information in the path searching apparatus according to the first embodiment.

FIG. 8 shows an example of a format structure of such interpolation position indicating information. Specifically, the interpolation position indicating information which is indicated to first searcher $42_1$ is indicated as control information indicating, as a unit, interpolation position 61 where the interpolation position specifying information is "interpolation" and oversampling number 62 corresponding thereto. If there are a plurality of pieces of interpolation position specifying information which are "interpolation", then as many pieces of interpolation position indicating information as the number of pieces of interpolation position specifying information are indicated to first searcher $42_1$. For example, when the number of channels to be processed is "1", then two pieces of interpolation position indicating information indicating that the interpolation position is "before correlation value calculation" and the oversampling number is "2" and that the interpolation position is "before in-phase addition" and the oversampling number is "2" are indicated to first searcher $42_1$.

First searcher $42_1$ which selects the insertion of an interpolation process into various operation processors in path search processor 46 based on the interpolation position indicating information indicated in the above format has a CPU, not shown, and performs various control processes based on a control program that is stored in a given memory such as a ROM or the like.

Figure 9:
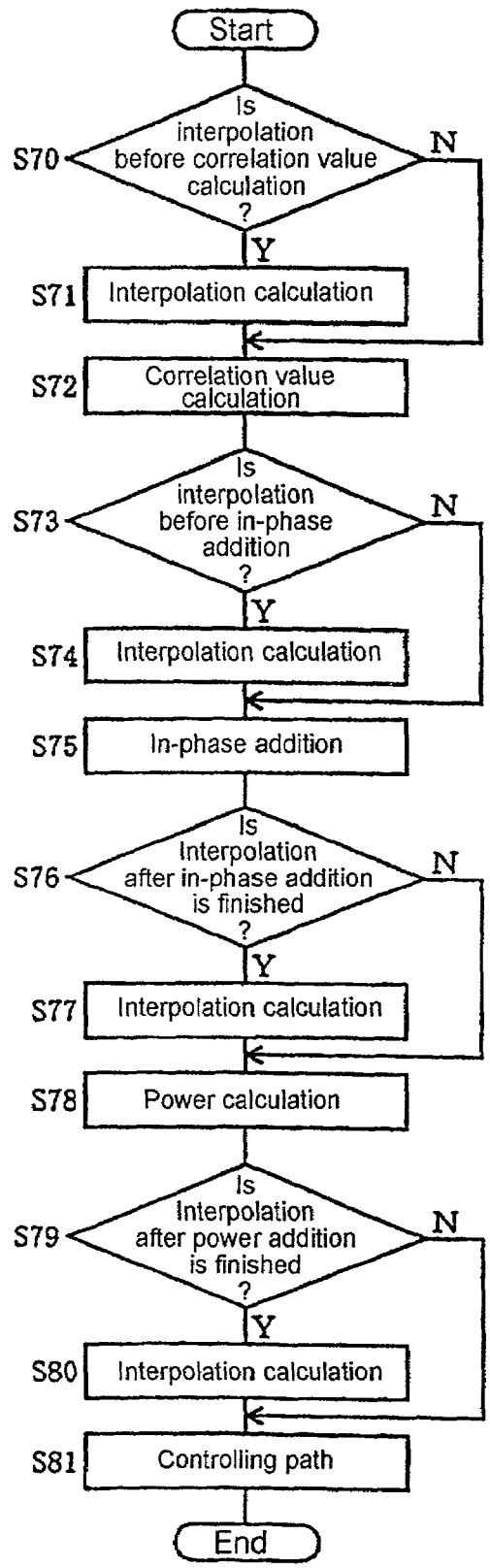
FIG. 9 is a flowchart schematically showing a processing sequence carried out by a searcher in the path searching apparatus according to the first embodiment.

FIG. 9 schematically shows the content of the processing of a control program that is stored in such a given memory. First searcher $42_1$ first refers to the interpolation position indicating information in the format shown in FIG. 8 which is indicated from interpolation position controller 44 to determine whether there is an interpolation position before a correlation value is calculated in step S70. If the interpolation position is "before correlation value calculation", then interpolating filter 48 having the structure shown in FIG. 3 interpolates a demodulated signal supplied from receiver 12 to reduce the chip interval thereof in step S71. To do so, the oversampling number may be set to "2", in the interpolating filter having the structure shown in FIG. 3.

If the interpolation position is not "before correlation value calculation" in step S70, or after performing the interpolation calculation in step S71, correlation value calculator 21 calculates correlation values of pilot signals which are added to the leading positions of respective time slots and which are of a predetermined fixed pattern, of I and Q signal components that have been quadrature-demodulated and despread. Since the pilot signals are of a fixed pattern, they can be determined with accuracy as an ideal reception signal in the reception side. In correlation value calculator 21, a correlation value with respect to an ideal reception signal generated from the pilot signal is calculated for each of the time slots of the received frame. As the correlation value is higher, the pilot signal at the leading position of each time slot is closer to an ideal waveform, indicating a better reception sensitivity.

Next in step S73, first searcher $42_1$ refers to the interpolation position indicating information indicated from interpolation position controller 44 to determine whether the interpolation position is "before in-phase addition" or not. If the interpolation position is "before in-phase addition", then interpolating filter 48 interpolates the calculated correlation value to reduce the chip interval thereof in step S74, as with step S71.

If the interpolation position is not "before in-phase addition" in step S73, or after performing interpolating operation in step S74, in-phase adder 22 adds signal components for the respective I and Q signal components for a given number of times N in step S75. Thus, noise components contained in the I and Q signals are removed. The greater the number of in-phase additions, the smaller the noise in each of the signal components.

Next, in step S76, first searcher $42_1$ refers to the interpolation position indicating information indicated from interpolation position controller 44 to determine whether the interpolation position is "after in-phase addition is finished" or not. If the interpolation position is "after in-phase addition is finished", then interpolating filter 48 interpolates the calculated correlation value to reduce the chip interval thereof in step S77, as with step S71.

If the interpolation position is not "after in-phase addition is finished" in step S76, or after performing interpolating operation in step S77, power adder 23 adds power values for a given number of times M in step S78. The power values are thus averaged with respect to time, preventing paths from being detected with wrong power values due to instantaneous noise.

Next, in step S79, first searcher $42_1$ refers to the interpolation position indicating information indicated from interpolation position controller 44 to determine whether the interpolation position is "after power addition is finished" or not. If the interpolation position is "after power addition is finished", then interpolating filter 48 interpolates the calculated correlation value to reduce the chip interval thereof in step S80, as with step S71.

In the interpolation position is not "after power addition is finished" in step S79, and/or when the interpolating calculation has been performed in step S80, the calculated power value becomes a delay profile indicating the reception signal that is converted into power values for respective delay times in a time series. Then, in step S81, path controller 47 detects a peak in excess of a predetermined threshold with respect to the power value for each delay time, and indicates a delay time corresponding to a peak in excess of the threshold to first finger $43_1$. Thereafter, the processing sequence is put to an end.

As described above, the path searching apparatus according to the first embodiment has interpolation position controller 44 which has stored information indicative of whether an interpolation process required to increase the detection accuracy for a path search depending on the number of communication channels to be processed is to be inserted or not, and oversampling numbers at the time an interpolation process is to be inserted. The path searching apparatus can change whether an interpolation process performed by interpolating filter 48 is to be inserted between various processors of path search processor 46 or not, based on interpolation information searched for depending on the number of channels to be processed which has been measured by number-of-communication-channel measuring unit 57. The interpolation information is established such that as the number of communication channels to be processed is smaller, an interpolation process is performed as a pre-process to increase the number of interpolation processes.

Consequently, it is possible to solve the conventional problem of a minimum accuracy for path detection which is achieved because an interpolation process has been performed in a fixed processing position regardless of the number of channels to be processed even if the number of communication channels is small and an extra amount of calculation available. The present embodiment can maintain a maximum amount of calculation depending on the number of channels to be processed for increasing the accuracy for path detection as much as possible when there is an extra amount of calculation available.

SECOND EMBODIMENT

The path searching apparatus according to the first embodiment inserts an interpolation process in a processing position depending on the number of communication channels during a path searching process, uniformly for each communication channel. On the contrary, according to a second embodiment, a path searching apparatus measures the quality of a reception signal in each communication channel and changes an interpolation position for a communication channel whose reception quality is low for thereby increasing the accuracy for path detection. The constitution of a base station apparatus to which the path searching apparatus according to the second embodiment is applicable is similar to that in the first embodiment. Therefore, the second embodiment will be described below mainly with respect to the constitution of a searcher and an interpolation position controller.

Figure 10:
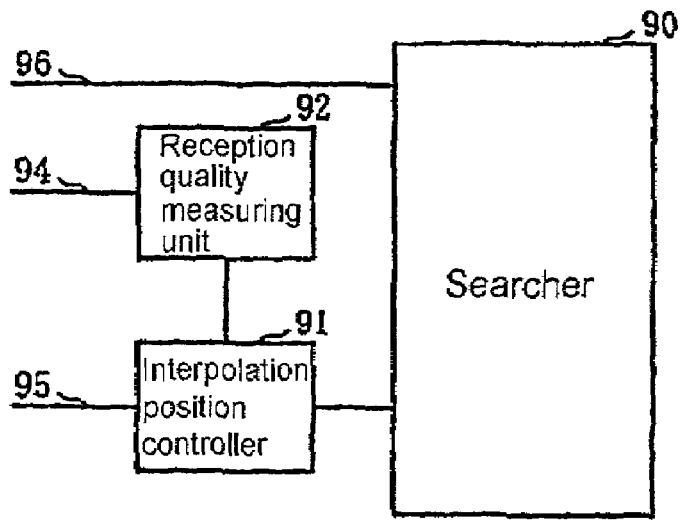
FIG. 10 is a block diagram showing an arrangement of an essential portion of a path searching apparatus according to a second embodiment of the present invention.

FIG. 10 schematically shows an arrangement of an essential portion of a searcher and a interpolation position controller which are the path searching apparatus according to the second embodiment. Here, the path searching apparatus has searcher 90, interpolation position controller 91, and reception quality measuring unit 92. If the path searching apparatus is applied to the base station apparatus in a mobile communication system of the CDMA scheme shown in FIG. 5, then searcher 90 corresponds to each of N searchers $42_1$ to $42_N$ shown in FIG. 5 and interpolation position controller 91 corresponds to interpolation position controller 44 shown in FIG. 5. Reception quality measuring unit 92 is provided in the base station apparatus for being shared by the searchers.

Reception quality measuring unit 92 is supplied with signal-to-interference ratio (SIR) values 94 calculated by RAKE combiners of the respective searchers and monitors reception qualities in respective communication channels. Furthermore, reception quality measuring unit 92 determines the reception quality level of a reception quality which is calculated by comparison with a plurality of predetermined thresholds, and indicates the reception quality level of a communication channel which is lower than a certain reception quality level and a communication channel number for identifying the communication channel, to interpolation position controller 91.

Interpolation position controller 91 has interpolation information corresponding to a plurality of reception quality levels in addition to the interpolation information shown in FIG. 7. In the interpolation information corresponding to the reception quality levels, interpolation position specifying information indicating whether an interpolation process is to be inserted or not between various processes during a path searching process shown in FIG. 7, and an oversampling number at the time an interpolation process is performed has been stored in advance. Interpolation position controller 91 is supplied with the number of communication channels 95 to be processed from parameter manager 41 and also specified with communication channels whose reception quality levels are lower than a predetermined level from reception quality measuring unit 92. Interpolation position controller 91 searches for interpolation information depending on the number of communication channels which has been measured by the number-of-communication-channel measuring unit. With respect to a communication channel whose reception quality is low which has been indicated from reception quality measuring unit 92, interpolation position controller 91 indicates interpolation information depending on the reception quality level, rather than the interpolation information searched for depending on the number of communication channels which has been measured by the number-of-communication-channel measuring unit, as interpolation position indicating information to the searchers in the respective communication channels. Based on thus indicated interpolation position indicating information, searcher 90 performs interpolating operation on demodulated signal 96 at an optimum position, and indicates a reception time instant to the finger.

Figure 11:
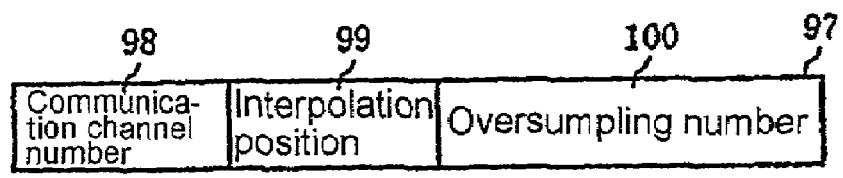
FIG. 11 is a flowchart schematically showing a processing sequence carried out by a searcher in the path searching apparatus according to the second embodiment.

FIG. 11 shows an example of the interpolation position indicating information indicated from the interpolation position controller. Interpolation position indicating information 97 is indicated as control information comprising, as a unit, interpolation position 99 where interpolation information specifying information is "interpolation", and corresponding oversampling number 100, wherein communication channel number 98 for identifying a communication channel is added to the leading portion.

Searcher 90 has, in addition to the arrangement of first searcher $42_1$ shown in FIG. 6, a determining unit for determining whether the interpolation position indicating information indicated in the format shown in FIG. 11 is addressed to itself or not. The determining unit determines the destination of the received interpolation position indicating information by comparing it with a communication channel number allotted in advance to its own searcher. If the received interpolation position indicating information is determined as being interpolation position indicating information addressed to itself, then determining unit inserts an interpolation process between various processes during a path searching process depending on the interpolation position and the oversampling number which are included in the interpolation position indicating information.

As described above, the path searching apparatus according to the second embodiment changes the position where an interpolation process is inserted during a path searching process, depending on not only the number of communication channels to be processed but also the reception quality level. Therefore, for a communication channel whose reception quality level is low, an interpolation process is inserted at a position for more interpolation processes so as to be able to carry out an accurate control process to achieve an increase in the accuracy for path detection.

In each of the above embodiments, the position for performing an interpolation process is changed. However, the present invention is not limited to such processing details. In the above embodiments, correlation value calculations, in-phase additions, and power additions are performed as a path searching process. However, the present invention is not limited to such processing details.

In each of the above embodiments, the interpolation position is changed depending on the communication channel. However, the present invention is not limited to such processing details. In view of the fact that one user may possibly use a plurality of communication channels, the interpolation position may be changed depending on the number of users.

In the above embodiments, the interpolation information is composed of the interpolation position specifying information and the oversampling number. However, the present invention is not limited to such processing details. For example, by setting the oversampling number to "2", in advance with the interpolating filter, the interpolation information memory may store only interpolation position specifying information for each communication channel or each reception quality level.

INDUSTRIAL APPLICABILITY

According to the present invention, as described above, the position for performing an interpolation process to increase the accuracy of a delay profile depending on the number of communication channels to be processed is changed to detect a path with optimum accuracy depending on a reception processing situation.

The insertion of an interpolation process may be selected before and after correlation value calculation, in-phase addition, and power addition for the generation of the delay profile. Therefore, in view of a trade-off between an increase in the amount of calculation due to the insertion of an interpolation process and an accuracy for path detection, the amount of calculation and the accuracy for path detection can be set to optimum values depending on the number of communication channels to be processed, making it possible to effectively utilize various resources of the apparatus.

An interpolation process for generating a delay profile is inserted at a position depending on the reception quality of each communication channel that has actually been measured, so that the position for performing an interpolation process can accurately be controlled for each communication channel, and the accuracy for path detection can be increased more flexibly depending on the reception quality.

The oversampling number for specifying a chip interval is included in interpolation information for controlling a finer interpolation process.

By increasing the number of interpolation processes when the amount of processing to be calculated is smaller, the accuracy for path detection can be increased by an extra calculation capability when the number of communication channels is small.

The invention claimed is:

1. A method of searching for a path, comprising:
   a first interpolating step of interpolating a demodulated signal to generate a first interpolated signal;
   a first selecting step of generating a first selected signal by alternatively selecting said first interpolated signal or said demodulated signal based on interpolation information, said interpolation information indicating whether an interpolation process for reducing a chip interval is to be performed or not between processes for generating a delay profile which indicates a temporal change of reception time instants of said demodulated signal due to multipath fading;
   a correlation value calculating step of calculating a correlation value between a pilot pattern which is included in said first selected signal and has a predetermined fixed pattern and a predetermined expected value;
   a second interpolating step of interpolating the correlation value calculated in said correlation value calculating step to generate a second interpolated signal;
   a second selecting step of generating a second selected signal by alternatively selecting said second interpolated signal and said correlation value based on said interpolation information;
   an in-phase adding step of adding in-phase components of said second selected signal for a predetermined number of times;
   a third interpolating step of interpolating an in-phase addition sum calculated in said in-phase adding step to generate a third interpolated signal;
   a third selecting step of generating a third selected signal by alternatively selecting said third interpolated signal or said in-phase addition sum based on said interpolation information;
   a power adding step of adding power values calculated from signal components of said third selected signal for a predetermined number of times;
   a fourth interpolating step of interpolating a power addition sum calculated in said power adding step to generate a fourth interpolated signal;
   a fourth selecting step of generating a fourth selected signal by alternatively selecting said fourth interpolated signal or said power addition sum based on said interpolation information; and
   a path detecting step of detecting a path in excess of a predetermined threshold based on said fourth selected signal.

2. A method of searching for a path according to claim 1, wherein said interpolation information comprises information indicative of whether said interpolation process is to be performed or not, depending on the number of communication channels to be processed.

3. A method of searching for a path according to claim 1, wherein said interpolation information comprises information indicative of whether said interpolation process is to be performed or not, depending on reception quality measured in each communication channel of said demodulated signal.

4. A method of searching for a path according to claim 1, wherein said interpolation information comprises information indicative of whether said interpolation process is to be performed or not, depending on the number of communication channels to be processed and reception quality measured in each communication channel of said demodulated signal.

5. A method of searching for a path according to claim 1, wherein said demodulated signal comprises a signal produced by converting a reception signal of a CDMA (Code Division Multiple Access) system into a baseband signal and processing the baseband signal by way of quadrature demodulation.

6. An apparatus for searching for a path, comprising:
   path searching means for generating a delay profile based on a pilot signal which is included in each time slot and has a fixed pattern, according to a path searching process composed of a plurality of processing units, said delay profile indicating a temporal change of reception time instants due to multipath fading of a demodulated signal;
   interpolation information storage means for storing interpolation information which indicates whether an interpolation process for reducing a chip interval is to be performed or not before and after each of the processing units;
   interpolation position processing control means for enabling said path searching means to perform an interpolation process before and after each of the processing units based on said interpolation information; and
   path detecting means for detecting a reception path based on the delay profile generated by said path searching means.

7. An apparatus for searching a path according to claim 6, wherein said interpolation information comprises information indicative of whether the interpolation process for reducing a chip interval is to be performed or not, depending on the number of communication channels to be processed.

8. An apparatus for searching a path according to claim 6, wherein said interpolation information comprises information indicative of whether the interpolation process for reducing a chip interval is to be performed or not, depending on the reception quality measured in each communication channel of said demodulated signal.

9. An apparatus for searching a path according to claim 6, wherein said interpolation information comprises information indicative of whether said interpolation process is to be performed or not, depending on the number of communication channels to be processed and the reception quality measured in each communication channel of said demodulated signal.

10. An apparatus for searching for a path, comprising:

interpolation information storage means for storing interpolation information indicative of whether an interpolation process for reducing a chip interval between processes for generating a delay profile is to be performed or not, said delay profile indicating a temporal change of reception time instants of a demodulated signal due to multipath fading;

first interpolating means for interpolating said demodulated signal to generate a first interpolated signal;

first selecting means for generating a first selected signal by alternatively selecting said first interpolated signal or said demodulated signal based on said interpolation information;

correlation value calculating means for calculating a correlation value between a pilot pattern which is included in said first selected signal and has a predetermined fixed pattern and a predetermined expected value;

second interpolating means for interpolating the corrected value calculated by said correlation value calculating means to generate a second interpolated signal;

second selecting means for generating a second selected signal by alternatively selecting said second interpolated signal and said correlation value based on said interpolation information;

in-phase adding means for adding in-phase components of said second selected signal for a predetermined number of times;

third interpolating means for interpolating an in-phase addition sum calculated by said in-phase adding means to generate a third interpolated signal;

third selecting means for generating a third selected signal by alternatively selecting said third interpolated signal or said in-phase addition sum based on said interpolation information;

power adding means for adding power values calculated from signal components of said third selected signal for a predetermined number of times;

fourth interpolating means for interpolating a power addition sum calculated in said power adding means to generate a fourth interpolated signal;

fourth selecting means for generating a fourth selected signal by alternatively selecting said fourth interpolated signal or said power addition sum based on said interpolation information; and path detecting means for detecting a path in excess of a predetermined threshold based on said fourth selected signal.

11. An apparatus for searching for a path according to claim 10, wherein said interpolation information comprises information indicative of whether the interpolation process for reducing a chip interval is to be performed or not, depending on the number of communication channels to be processed.

12. An apparatus for searching for a path according to claim 10, wherein said demodulated signal comprises a signal produced by converting a reception signal of a CDMA (Code Division Multiple Access) system into a baseband signal and processing the baseband signal by way of quadrature demodulation.

13. An apparatus for searching for a path according to claim 10, further comprising reception quality measuring means for measuring a reception quality in each communication channel of said demodulated signal, wherein said interpolation information comprises information indicative of whether the interpolation process for reducing a chip interval is to be performed or not, depending on the reception quality measured in each communication channel of said demodulated signal.

14. An apparatus for searching for a path according to claim 10, further comprising reception quality measuring means for measuring a reception quality in each communication channel of said demodulated signal, wherein said interpolation information comprises information indicative of whether the interpolation process for reducing a chip interval is to be performed or not, depending on the number of communication channels to be processed and the reception quality measured in each communication channel of said demodulated signal.

15. An apparatus for searching for a path according to claim 10, wherein said interpolation information comprises interpolation position specifying information indicative of whether the interpolation process for reducing a chip interval is to be performed or not depending on the number of communication channels to be processed between processes for generating said delay profile, and an oversampling number, wherein each of said first to fourth selecting means makes an alternative selection based on said interpolation position specifying information, and wherein each of said first to fourth interpolating means performs an interpolation based on the corresponding oversampling number.

16. An apparatus for searching for a path according to claim 11, wherein said interpolation information is set to perform the interpolation process between processes for achieving more interpolation processes as the number of communication channels to be processes is smaller.

17. An apparatus for searching for a path according to claim 15, wherein said interpolation information is set to perform the interpolation process between processes for achieving more interpolation processes as the number of communication channels to be processes is smaller.

* * * * *